Jan. 12, 1954

G. JONES 2,665,665

AUTOMATIC LIVESTOCK SPRAYER

Filed Jan. 2, 1953

INVENTOR.
Grover Jones,
BY Victor J.Evans&Co.
ATTORNEYS

Jan. 12, 1954
G. JONES
2,665,665
AUTOMATIC LIVESTOCK SPRAYER
Filed Jan. 2, 1953
2 Sheets-Sheet 2
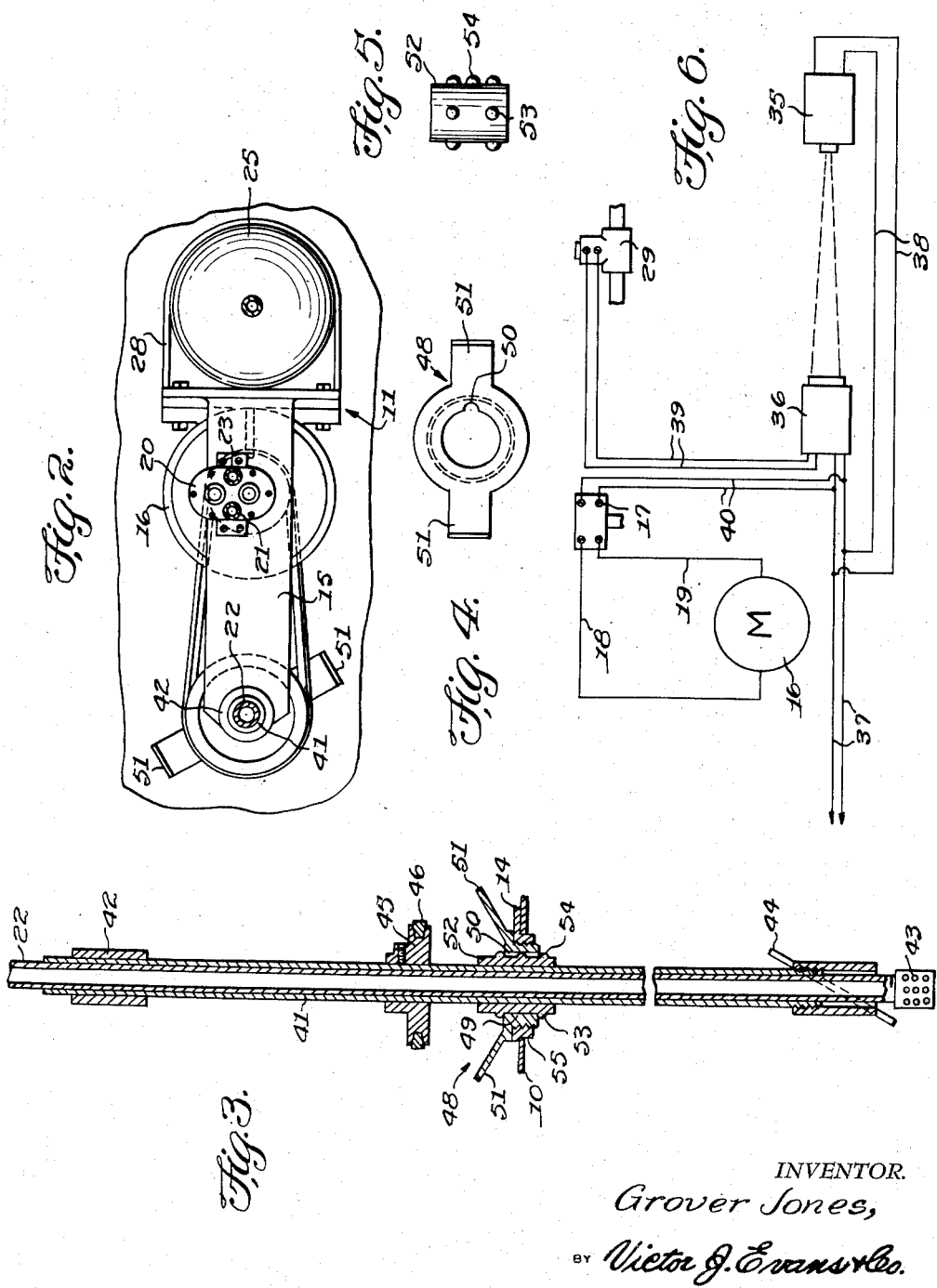
INVENTOR.
Grover Jones,
BY Victor J. Evans & Co.
ATTORNEYS Patented Jan. 12, 1954

2,665,665

UNITED STATES PATENT OFFICE 2,665,665

AUTOMATIC LIVESTOCK SPRAYER

Grover Jones, Arkansas City, Ark.

Application January 2, 1953, Serial No. 329,283

3 Claims. (Cl. 119—159)

This invention relates to an apparatus for spraying livestock with disinfectant.

The object of the invention is to provide an apparatus for automatically spraying livestock with disinfectant as the livestock pass through a gate, the present invention being compact and readily attached to and detached from a storage tank containing the disinfectant.

Another object of the invention is to provide an automatic livestock sprayer which includes a frame having an electric motor attached thereto, the frame adapted to be positioned upon the top of a drum or container, there being an agitator arranged in the container and a pump which is connected to the tank and to a series of spray nozzles, the unit adapted to be readily attached to the barrel or container and operable upon the livestock passing through a gate to break a beam which is actuated by a photoelectric cell.

A further object of the invention is to provide an automatic livestock sprayer which is extremely simple and inexpensive to manufacture.

Other objects and advantages will be apparent during the course of the following description.

In the accompanying drawings, forming a part of this application, and in which like numerals are used to designate like parts throughout the same:

Figure 2 is an enlarged sectional view taken on the line 2—2 of Figure 1.

Figure 3 is an enlarged sectional view with parts broken away taken on the line 3—3 of Figure 1, and with the barrel or container removed.

Figure 4 is a top plan view of the bung.

Figure 5 is a side elevational view of the bushings for fitting in the bung.

Figure 6 is a schematic showing of the wiring diagram for the present invention.

Figure 1:
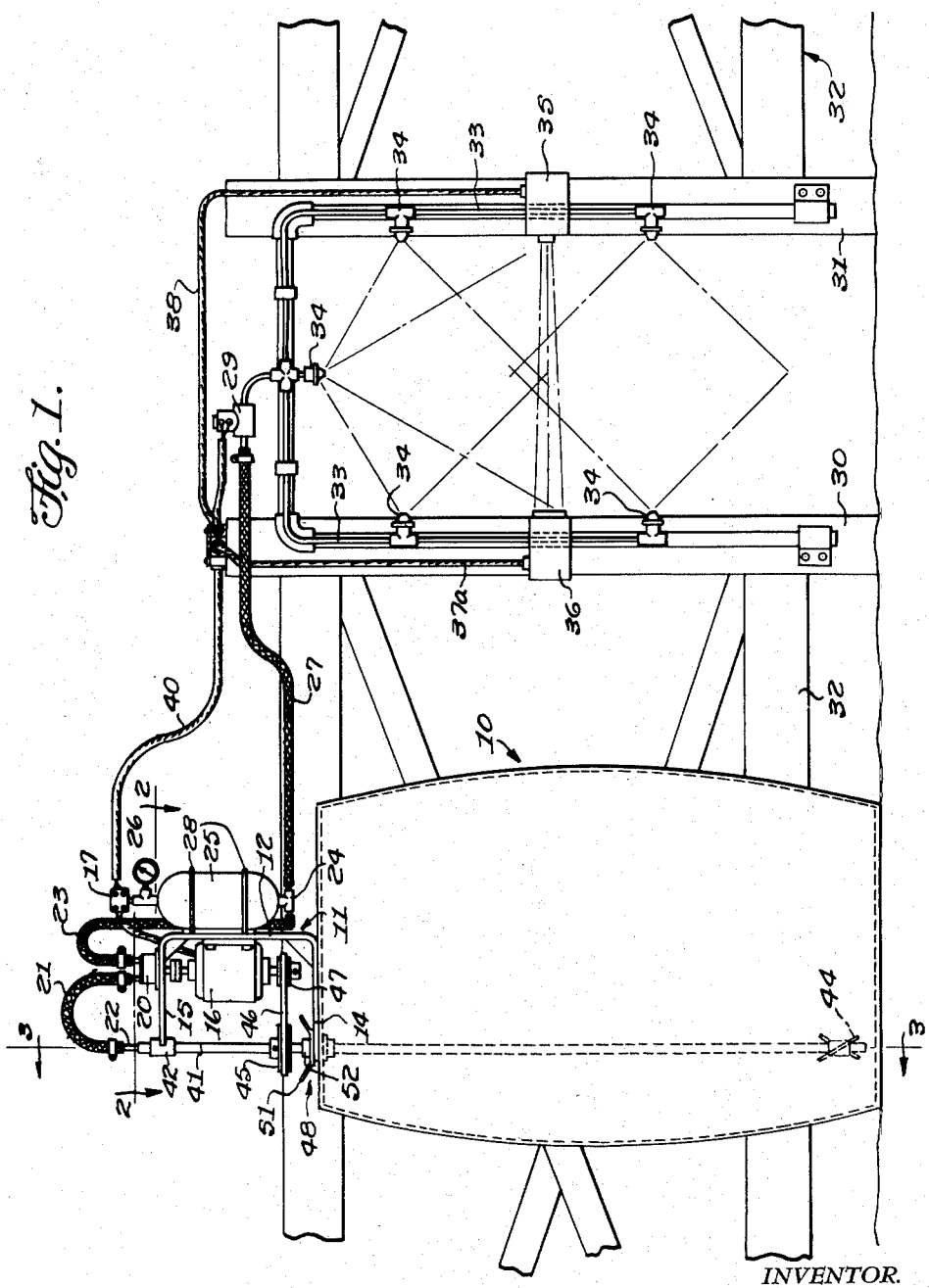
Figure 1 is an elevational view of the assembly, constructed according to the present invention.

Referring in detail to the drawings, the numeral 10 designates a container or barrel which may be made of any suitable material, and the container 10 is adapted to hold a quantity of liquid disinfectant therein. Releasably mounted on the top of the container 10 is a U-shaped bracket 11 which includes a vertically disposed web 12, Figure 1, and a pair of spaced parallel horizontally disposed arms 14 and 15. An electric motor 16 is connected to the vertical web 12, and the motor 16 serves to operate a pump 20. Suitable electric lines 18 and 19 serve to connect the motor 16 to a pressure switch 17.

The fluid pump 20 which is operated by the motor 16, is connected by a hose 21 to the upper end of a vertically disposed tube 22 which extends down into the container 10. A second hose 23 leads from the pump 20 to a T-fitting 24, and connected to the T-fitting 24 is a storage tank 25. A pressure gauge 26 is arranged in communication with the storage tank 25, and the pressure gauge 26 is positioned contiguous to the pressure switch 17. The tank 25 is connected to the web 12 by brackets 28.

A conduit hose 27 leads from the T-fitting 24 to a solenoid valve 29 for a purpose to be later described. The present invention is adapted to be used on a farm or similar locality wherein the numeral 32 designates a portion of a fence. The numerals 30 and 31 designate spaced apart vertically disposed beams which define therebetween a gate through which the livestock passes. Arranged adjacent the upper ends of the beams 30 and 31 is the solenoid valve 29. Suitable pipes or conduits 33 extend vertically along the beams 30 and 31 and therebetween, and the conduits 33 may be secured to the beams in any suitable manner. A plurality of nozzles 34 are interposed in the conduits 33 whereby livestock passing between the beams 30 and 31 will be completely sprayed with the disinfectant issuing from the nozzles 34.

A means is provided for automatically actuating the mechanism as soon as an animal passes into the space between the beams 30 and 31, and this means comprises a photoelectric cell 36 which is arranged opposite a lamp 35. Cable 37 is adapted to connect the electrical mechanism to a suitable source of supply of electrical energy, and electric lines 38 may lead from the electric lines in cable 37 to the lamp 35. Suitable electric wires 39 in cable 37a are adapted to lead from the photoelectric cell 36 to the solenoid valve 29, and wires 40 lead from the pressure switch 17 to the electric supply lines 37 in a cable 37a.

Slidably mounted on the tube 22 is a rotatable shaft 41, the shaft 41 being rotatable in a bearing 42 which is connected to the arm 15. A filter or strainer 43 is mounted on the lower end of the tube 22, and agitator blades 44 are detachably mounted on the bottom or lower end of the shaft 41. A pulley 45 is secured to the outer shaft 41, and a belt 46 is trained over the pulley 45 and over a pulley 47 which is rotated by the motor 16.

The numeral 48 designates a bung which is adapted to be arranged in threaded engagement with the threaded opening 55 in the top of the drum or barrel 10. The bung 48 is provided with a central opening 49 for receiving a bushing 52, and wings 51 extend from the bung 48 for facilitating the manual rotation thereof. The bung 48 is further provided with a slot 50 for receiving the extensions or knobs 54, there being other of the knobs 53 extending from the bushing 52.

From the foregoing, it is apparent that an apparatus has been provided which is especially suitable for spraying livestock such as cows and the like with disinfectant. The frame or yoke 11 is adapted to be positioned upon the storage tank 10 and the nozzles 34 will spray the fluid onto the animals between the beams 30 and 31 which constitute the gate. Thus, in use the lamp 35 and photoelectric cell 36 are mounted on the gate so that when the livestock pass through the gate they will break the beam of light which causes the photoelectric cell 36 to operate the solenoid valve 29 to thereby permit a spray mixture to be sprayed onto the animal as long as it remains in the gate. In applicant's system the material is sprayed under pressure at all times and delivered to the solenoid valve 29 under pressure. Thus, a large quantity of disinfectant can be placed in the tank 10 so that it will not be necessary to refill the tank very often. The pump 20 is a liquid pressure pump which is operated by the motor 16. The supply unit is small so that it can be readily screwed into the opening 55 of the barrel 18, there being agitator blades 44 on the bottom of the shaft 41. This agitator automatically comes on and goes off when the pressure switch 17 starts and stops the pump motor 16. The bung 48 is of such a construction that it includes wings 51 which facilitate the rotation thereof. The agitator blades 44 keep the material constantly stirred up when the motor is operating. The tube 22 is stationary and the shaft 41 rotates. Also, the shaft 41 can be adjusted vertically up and down so that it will fit various sizes of barrels. The floating bushing 52 is adapted to be inserted in the opening 49 in the bung 48 and this bushing 52 insures that the parts will always be properly aligned. The knob 54 which engages in the slot 50 prevents the bushing from rotating when the shaft 41 is rotating, and the other knobs 53 on the bushing 52 frictionally engage the bung to prevent the bushing from accidentally falling out of the bung. The tank 25 is a storage tank and when the pressure in the tank 25 decreases below a predetermined level, as indicated by the gauge 26, the pressure switch 17 will cause the motor 16 to again start operating until the pressure in the tank 25 is built up.

I claim:

1. In combination, a container adapted to hold a quantity of liquid disinfectant for livestock, there being an opening in the top of said container, a bung arranged in engagement with said opening and provided with divergent wings, a bushing positioned in said bung, cooperating means on said bushing and bung, a U-shaped bracket arranged on the top of said container and including a vertically disposed web and a pair of spaced parallel horizontally disposed arms, a motor connected to said web and adapted to be connected to a source of electrical energy, a pump operated by said motor and arranged thereabove, a bearing connected to the upper of said arms, a hollow vertically disposed tube extending into said container, a hose connecting the upper end of said tube to said pump, a hollow shaft rotatably mounted in said bearing and positioned on said tube, belt and pulley means connecting said motor to said shaft, a gate including spaced parallel vertically disposed beams, conduits connected to said beams and arranged contiguous thereto, a hose connecting said pump to said conduits, a solenoid valve connected to said conduits, a storage tank arranged in communication with said conduits and connected to said web, a pressure switch operated by the pressure in said storage tank for causing actuation of said motor and pump, an electric lamp connected to one of said beams, and a photoelectric cell arranged in opposed relation with respect to said lamp and mounted on the other of said beams.

2. The apparatus as described in claim 1, and further including a filter mounted on the lower end of said tube.

3. The apparatus as described in claim 1, and further including agitator blades mounted on the lower end of said shaft.

GROVER JONES.

References Cited in the file of this patent

UNITED STATES PATENTS

| Number | Name | Date |
|---|---|---|
| Re. 16,314 | Kenney | Apr. 6, 1926 |
| 667,588 | Sheldon | Feb. 5, 1901 |
| 1,184,644 | Heaps et al. | May 23, 1916 |
| 1,861,230 | Butler | May 31, 1932 |
| 2,238,872 | Mather et al. | Apr. 15, 1941 |
| 2,397,855 | Grams | Apr. 2, 1946 |